United States Patent
James

(10) Patent No.: US 7,447,240 B2
(45) Date of Patent: *Nov. 4, 2008

(54) METHOD AND SYSTEM FOR SYNCHRONIZING COMMUNICATIONS LINKS IN A HUB-BASED MEMORY SYSTEM

(75) Inventor: Ralph James, Andover, MN (US)

(73) Assignee: Micron Technology, Inc., Boise, ID (US)

( * ) Notice: Subject to any disclaimer, the term of this patent is extended or adjusted under 35 U.S.C. 154(b) by 697 days.

This patent is subject to a terminal disclaimer.

(21) Appl. No.: 10/813,040

(22) Filed: Mar. 29, 2004

(65) Prior Publication Data

US 2005/0213611 A1 Sep. 29, 2005

(51) Int. Cl.
*H04J 3/06* (2006.01)

(52) U.S. Cl. .......................... 370/516; 710/22; 365/63

(58) Field of Classification Search ................ 370/248, 370/249, 503, 512, 520; 711/154, 167
See application file for complete search history.

(56) References Cited

U.S. PATENT DOCUMENTS

| | | | |
|---|---|---|---|
| 3,742,253 A | 6/1973 | Kronies | 307/247 |
| 4,045,781 A | 8/1977 | Levy et al. | 364/200 |
| 4,078,228 A * | 3/1978 | Miyazaki | 370/460 |
| 4,240,143 A | 12/1980 | Besemer et al. | 364/200 |
| 4,245,306 A | 1/1981 | Besemer et al. | 364/200 |
| 4,253,144 A | 2/1981 | Bellamy et al. | 364/200 |
| 4,253,146 A | 2/1981 | Bellamy et al. | 364/200 |
| 4,608,702 A | 8/1986 | Hirzel et al. | 375/110 |
| 4,707,823 A | 11/1987 | Holdren et al. | 370/1 |
| 4,724,520 A | 2/1988 | Athanas et al. | 364/200 |
| 4,831,520 A | 5/1989 | Rubinfeld et al. | 364/200 |

(Continued)

FOREIGN PATENT DOCUMENTS

EP 0 709 786 A1 5/1996

(Continued)

OTHER PUBLICATIONS

Intel, "Intel 840 Chipset: 82840 Memory Controller Hub (MCH)", Datasheet, Oct. 1999, pp. 1-178.

(Continued)

*Primary Examiner*—Ricky Ngo
*Assistant Examiner*—Kan Yuen
(74) *Attorney, Agent, or Firm*—Dorsey & Whitney LLP

(57) ABSTRACT

A method is disclosed for synchronizing communications links in a memory hub system. The system includes a system controller and a plurality of memory hubs coupled in series, with pairs of downstream and upstream links being coupled between adjacent modules and the controller. The method includes synchronizing each upstream and downstream link. In a clockwise order starting with the downstream link coupled between the controller and the first memory module, the next adjacent clockwise link is signaled that the prior clockwise link has been synchronized. The method detects through the upstream link coupled between the controller and the first memory module when all links have been synchronized. In a clockwise order starting with the downstream link coupled between the controller and the first memory module, each link is enabled. The method detects through the upstream link coupled between the controller and first memory module when all links have been enabled.

31 Claims, 4 Drawing Sheets

U.S. PATENT DOCUMENTS

| | | | |
|---|---|---|---|
| 4,843,263 A | 6/1989 | Ando | 307/480 |
| 4,891,808 A | 1/1990 | Williams | 370/112 |
| 4,930,128 A | 5/1990 | Suzuki et al. | 371/12 |
| 4,953,930 A | 9/1990 | Ramsey et al. | 350/96.11 |
| 4,982,185 A * | 1/1991 | Holmberg et al. | 340/825.21 |
| 5,241,506 A | 8/1993 | Motegi et al. | 365/210 |
| 5,243,703 A | 9/1993 | Farmwald et al. | 395/325 |
| 5,251,303 A | 10/1993 | Fogg, Jr. et al. | 395/275 |
| 5,269,022 A | 12/1993 | Shinjo et al. | 395/700 |
| 5,299,293 A * | 3/1994 | Mestdagh et al. | 398/24 |
| 5,313,590 A | 5/1994 | Taylor | 395/325 |
| 5,317,752 A | 5/1994 | Jewett et al. | 395/750 |
| 5,319,755 A | 6/1994 | Farmwald et al. | 395/325 |
| 5,327,553 A | 7/1994 | Jewett et al. | 395/575 |
| 5,355,391 A | 10/1994 | Horowitz et al. | 375/36 |
| 5,432,823 A | 7/1995 | Gasbarro et al. | 375/356 |
| 5,432,907 A | 7/1995 | Picazo, Jr. et al. | 395/200 |
| 5,442,770 A | 8/1995 | Barratt | 395/403 |
| 5,461,627 A | 10/1995 | Rypinski | 370/95.2 |
| 5,465,229 A | 11/1995 | Bechtolsheim et al. | 345/477 |
| 5,479,370 A | 12/1995 | Furuyama et al. | 365/189.12 |
| 5,497,476 A | 3/1996 | Oldfield et al. | 395/439 |
| 5,502,621 A | 3/1996 | Schumacher et al. | 361/760 |
| 5,544,319 A | 8/1996 | Acton et al. | 395/200.07 |
| 5,566,325 A | 10/1996 | Bruce, II et al. | 395/494 |
| 5,577,220 A | 11/1996 | Combs et al. | 395/416 |
| 5,581,767 A | 12/1996 | Katsuki et al. | 395/800 |
| 5,606,717 A | 2/1997 | Farmwald et al. | 395/856 |
| 5,638,334 A | 6/1997 | Farmwald et al. | 365/230.03 |
| 5,659,798 A | 8/1997 | Blumrich et al. | 395/846 |
| 5,687,325 A | 11/1997 | Chang | 395/284 |
| 5,706,224 A | 1/1998 | Srinivasan et al. | 365/49 |
| 5,715,456 A | 2/1998 | Bennett et al. | 395/652 |
| 5,729,709 A | 3/1998 | Harness | 395/405 |
| 5,748,616 A | 5/1998 | Riley | 370/242 |
| 5,818,844 A | 10/1998 | Singh et al. | 370/463 |
| 5,819,304 A | 10/1998 | Nilsen et al. | 711/5 |
| 5,822,255 A | 10/1998 | Uchida | 365/194 |
| 5,832,250 A | 11/1998 | Whittaker | 395/471 |
| 5,875,352 A | 2/1999 | Gentry et al. | 395/843 |
| 5,875,454 A | 2/1999 | Craft et al. | 711/113 |
| 5,928,343 A | 7/1999 | Farmwald et al. | 710/104 |
| 5,966,724 A | 10/1999 | Ryan | 711/105 |
| 5,973,935 A | 10/1999 | Schoenfeld et al. | 361/813 |
| 5,973,951 A | 10/1999 | Bechtolsheim et al. | 365/52 |
| 5,978,567 A | 11/1999 | Rebane et al. | 395/200.49 |
| 5,987,196 A | 11/1999 | Noble | 385/14 |
| 6,014,721 A | 1/2000 | Arimilli et al. | 710/129 |
| 6,023,726 A | 2/2000 | Saksena | 709/219 |
| 6,029,250 A | 2/2000 | Keeth | 713/400 |
| 6,031,241 A | 2/2000 | Silfvast et al. | 250/504 R |
| 6,033,951 A | 3/2000 | Chao | 438/253 |
| 6,038,630 A | 3/2000 | Foster et al. | 710/132 |
| 6,061,263 A | 5/2000 | Boaz et al. | 365/51 |
| 6,061,296 A | 5/2000 | Ternullo, Jr. et al. | 365/233 |
| 6,064,706 A * | 5/2000 | Driskill et al. | 375/372 |
| 6,067,262 A | 5/2000 | Irrinki et al. | 365/201 |
| 6,067,649 A | 5/2000 | Goodwin | 714/718 |
| 6,073,190 A | 6/2000 | Rooney | 710/56 |
| 6,076,139 A | 6/2000 | Welker et al. | 711/104 |
| 6,079,008 A | 6/2000 | Clery, III | 712/11 |
| 6,098,158 A | 8/2000 | Lay et al. | 711/162 |
| 6,100,735 A | 8/2000 | Lu | 327/158 |
| 6,105,075 A | 8/2000 | Ghaffari | 710/5 |
| 6,125,431 A | 9/2000 | Kobayashi | 711/154 |
| 6,131,149 A | 10/2000 | Lu et al. | 711/167 |
| 6,134,624 A | 10/2000 | Burns et al. | 710/131 |
| 6,137,709 A | 10/2000 | Boaz et al. | 365/51 |
| 6,144,587 A | 11/2000 | Yoshida | 365/189.05 |
| 6,167,465 A | 12/2000 | Parvin et al. | 710/22 |
| 6,167,486 A | 12/2000 | Lee et al. | 711/120 |
| 6,175,571 B1 | 1/2001 | Haddock et al. | 370/423 |
| 6,185,352 B1 | 2/2001 | Hurley | 385/114 |
| 6,186,400 B1 | 2/2001 | Dvorkis et al. | 235/462.45 |
| 6,191,663 B1 | 2/2001 | Hannah | 333/17.3 |
| 6,201,724 B1 | 3/2001 | Ishizaki et al. | 365/49 |
| 6,208,180 B1 | 3/2001 | Fisch et al. | 327/141 |
| 6,219,725 B1 | 4/2001 | Diehl et al. | 710/26 |
| 6,233,376 B1 | 5/2001 | Updegrove | 385/14 |
| 6,243,769 B1 | 6/2001 | Rooney | 710/56 |
| 6,243,831 B1 | 6/2001 | Mustafa et al. | 714/24 |
| 6,246,618 B1 | 6/2001 | Yamamoto et al. | 365/200 |
| 6,247,107 B1 | 6/2001 | Christie | 711/216 |
| 6,249,802 B1 | 6/2001 | Richardson et al. | 709/200 |
| 6,256,325 B1 * | 7/2001 | Park | 370/503 |
| 6,256,692 B1 | 7/2001 | Yoda et al. | 710/104 |
| 6,272,600 B1 | 8/2001 | Talbot et al. | 711/140 |
| 6,272,609 B1 | 8/2001 | Jeddeloh | 711/169 |
| 6,278,755 B1 * | 8/2001 | Baba et al. | 375/360 |
| 6,285,349 B1 | 9/2001 | Smith | 345/147 |
| 6,286,083 B1 | 9/2001 | Chin et al. | 711/151 |
| 6,289,068 B1 | 9/2001 | Hassoun et al. | 375/376 |
| 6,294,937 B1 | 9/2001 | Crafts et al. | 327/158 |
| 6,301,637 B1 | 10/2001 | Krull et al. | 711/112 |
| 6,324,485 B1 * | 11/2001 | Ellis | 702/117 |
| 6,327,642 B1 | 12/2001 | Lee et al. | 711/120 |
| 6,330,205 B2 | 12/2001 | Shimizu et al. | 365/230.096 |
| 6,347,055 B1 | 2/2002 | Motomura | 365/189.05 |
| 6,349,363 B2 | 2/2002 | Cai et al. | 711/129 |
| 6,356,573 B1 | 3/2002 | Jonsson et al. | 372/46 |
| 6,367,074 B1 | 4/2002 | Bates et al. | 717/11 |
| 6,370,068 B2 | 4/2002 | Rhee | 365/196 |
| 6,373,777 B1 | 4/2002 | Suzuki | 365/230.03 |
| 6,381,190 B1 | 4/2002 | Shinkai | 365/230.03 |
| 6,392,653 B1 | 5/2002 | Malandain et al. | 345/501 |
| 6,401,213 B1 | 6/2002 | Jeddeloh | 713/401 |
| 6,405,280 B1 | 6/2002 | Ryan | 711/105 |
| 6,421,744 B1 | 7/2002 | Morrison et al. | 710/22 |
| 6,430,696 B1 | 8/2002 | Keeth | 713/503 |
| 6,434,639 B1 | 8/2002 | Haghighi | 710/39 |
| 6,434,696 B1 | 8/2002 | Kang | 713/2 |
| 6,434,736 B1 | 8/2002 | Schaecher et al. | 716/17 |
| 6,438,622 B1 | 8/2002 | Haghighi et al. | 710/1 |
| 6,438,668 B1 | 8/2002 | Esfahani et al. | 711/165 |
| 6,449,308 B1 | 9/2002 | Knight, Jr. et al. | 375/212 |
| 6,453,393 B1 | 9/2002 | Holman et al. | 711/154 |
| 6,462,978 B2 | 10/2002 | Shibata et al. | 365/63 |
| 6,463,059 B1 | 10/2002 | Movshovich et al. | 370/389 |
| 6,467,013 B1 | 10/2002 | Nizar | 711/1 |
| 6,470,422 B2 | 10/2002 | Cai et al. | 711/129 |
| 6,473,828 B1 | 10/2002 | Matsui | 711/104 |
| 6,477,592 B1 | 11/2002 | Chen et al. | 710/52 |
| 6,477,614 B1 | 11/2002 | Leddige et al. | 711/5 |
| 6,477,621 B1 | 11/2002 | Lee et al. | 711/120 |
| 6,479,322 B2 | 11/2002 | Kawata et al. | 438/109 |
| 6,487,556 B1 | 11/2002 | Downs et al. | 707/101 |
| 6,490,188 B2 | 12/2002 | Nuxoll et al. | 365/63 |
| 6,493,803 B1 | 12/2002 | Pham et al. | 711/147 |
| 6,496,909 B1 | 12/2002 | Schimmel | 711/163 |
| 6,501,471 B1 | 12/2002 | Venkataraman et al. | 345/424 |
| 6,505,287 B2 | 1/2003 | Uematsu | 711/170 |
| 6,523,092 B1 | 2/2003 | Fanning | 711/134 |
| 6,523,093 B1 | 2/2003 | Bogin et al. | 711/137 |
| 6,526,483 B1 | 2/2003 | Cho et al. | 711/154 |
| 6,539,490 B1 | 3/2003 | Forbes et al. | 713/401 |
| 6,552,564 B1 | 4/2003 | Forbes et al. | 326/30 |
| 6,564,329 B1 | 5/2003 | Cheung et al. | 713/322 |
| 6,587,912 B2 | 7/2003 | Leddige et al. | 711/5 |
| 6,590,816 B2 | 7/2003 | Perner | 365/200 |
| 6,594,713 B1 | 7/2003 | Fuoco et al. | 710/31 |
| 6,594,722 B1 | 7/2003 | Willke, II et al. | 710/313 |
| 6,598,154 B1 | 7/2003 | Vaid et al. | 712/237 |
| 6,615,325 B2 | 9/2003 | Mailloux et al. | 711/154 |
| 6,622,188 B1 | 9/2003 | Goodwin et al. | 710/101 |

| | | | |
|---|---|---|---|
| 6,622,227 B2 | 9/2003 | Zumkehr et al. | 711/167 |
| 6,628,294 B1 | 9/2003 | Sadowsky et al. | 345/568 |
| 6,629,220 B1 | 9/2003 | Dyer | 711/158 |
| 6,631,440 B2 | 10/2003 | Jenne et al. | 711/105 |
| 6,636,110 B1 | 10/2003 | Ooishi et al. | 327/565 |
| 6,636,912 B2 | 10/2003 | Ajanovic et al. | 710/105 |
| 6,646,929 B1 | 11/2003 | Moss et al. | 365/194 |
| 6,658,509 B1 | 12/2003 | Bonella et al. | 710/100 |
| 6,662,304 B2 | 12/2003 | Keeth et al. | 713/400 |
| 6,665,202 B2 | 12/2003 | Lindahl et al. | 365/49 |
| 6,667,895 B2 | 12/2003 | Jang et al. | 365/63 |
| 6,667,926 B1 | 12/2003 | Chen et al. | 365/221 |
| 6,670,833 B2 | 12/2003 | Kurd et al. | 327/156 |
| 6,681,292 B2 | 1/2004 | Creta et al. | 711/119 |
| 6,697,926 B2 | 2/2004 | Johnson et al. | 711/167 |
| 6,715,018 B2 | 3/2004 | Farnworth et al. | 710/300 |
| 6,718,440 B2 | 4/2004 | Maiyuran et al. | 711/137 |
| 6,721,195 B2 | 4/2004 | Brunelle et al. | 365/63 |
| 6,721,860 B2 | 4/2004 | Klein | 711/154 |
| 6,724,685 B2 | 4/2004 | Braun et al. | 365/233 |
| 6,728,800 B1 | 4/2004 | Lee et al. | 710/54 |
| 6,735,679 B1 | 5/2004 | Herbst et al. | 711/167 |
| 6,735,682 B2 | 5/2004 | Segelken et al. | 711/220 |
| 6,742,098 B1 | 5/2004 | Halbert et al. | 711/172 |
| 6,745,275 B2 | 6/2004 | Chang | 710/305 |
| 6,751,703 B2 | 6/2004 | Chilton | 711/113 |
| 6,754,812 B1 | 6/2004 | Abdallah et al. | 712/234 |
| 6,756,661 B2 | 6/2004 | Tsuneda et al. | 257/673 |
| 6,760,833 B1 | 7/2004 | Dowling | 712/34 |
| 6,771,538 B2 | 8/2004 | Shukuri et al. | 365/185.05 |
| 6,775,747 B2 | 8/2004 | Venkatraman | 711/137 |
| 6,782,435 B2 | 8/2004 | Garcia et al. | 710/33 |
| 6,789,173 B1 | 9/2004 | Tanaka et al. | 711/147 |
| 6,792,059 B2 | 9/2004 | Yuan et al. | 375/354 |
| 6,792,496 B2 | 9/2004 | Aboulenein et al. | 710/306 |
| 6,795,899 B2 | 9/2004 | Dodd et al. | 711/137 |
| 6,799,246 B1 | 9/2004 | Wise et al. | 711/117 |
| 6,799,268 B1 | 9/2004 | Boggs et al. | 712/228 |
| 6,804,760 B2 | 10/2004 | Wiliams | 711/170 |
| 6,804,764 B2 | 10/2004 | LaBerge et al. | 711/170 |
| 6,807,630 B2 | 10/2004 | Lay et al. | 713/2 |
| 6,811,320 B1 | 11/2004 | Abbott | 385/58 |
| 6,816,947 B1 | 11/2004 | Huffman | 711/151 |
| 6,820,181 B2 | 11/2004 | Jeddeloh et al. | 711/169 |
| 6,821,029 B1 | 11/2004 | Grung et al. | 385/92 |
| 6,823,023 B1 | 11/2004 | Hannah | 375/296 |
| 6,845,409 B1 | 1/2005 | Talagala et al. | 710/20 |
| 6,889,304 B2 | 5/2005 | Perego et al. | 711/170 |
| 6,901,494 B2 | 5/2005 | Zumkehr et al. | 711/167 |
| 6,904,556 B2 | 6/2005 | Walton et al. | 714/766 |
| 6,910,109 B2 | 6/2005 | Holman et al. | 711/156 |
| 6,912,612 B2 | 6/2005 | Kapur et al. | 710/309 |
| 6,947,672 B2 | 9/2005 | Jiang et al. | 398/135 |
| 7,046,060 B1 | 5/2006 | Minzoni et al. | 327/158 |
| 7,068,085 B2 | 6/2006 | Gomm et al. | 327/158 |
| 7,181,584 B2 * | 2/2007 | LaBerge | 711/167 |
| 7,187,742 B1 * | 3/2007 | Logue et al. | 375/376 |
| 2001/0038611 A1 * | 11/2001 | Darcie et al. | 370/248 |
| 2001/0039612 A1 | 11/2001 | Lee | 713/2 |
| 2002/0112119 A1 | 8/2002 | Halbert et al. | 711/115 |
| 2002/0116588 A1 | 8/2002 | Beckert et al. | 711/161 |
| 2002/0144064 A1 | 10/2002 | Fanning | 711/144 |
| 2003/0005223 A1 | 1/2003 | Coulson et al. | 711/118 |
| 2003/0005344 A1 | 1/2003 | Bhamidipati et al. | 713/400 |
| 2003/0043158 A1 | 3/2003 | Wasserman et al. | 345/545 |
| 2003/0043426 A1 | 3/2003 | Baker et al. | 359/109 |
| 2003/0093630 A1 | 5/2003 | Richard et al. | 711/154 |
| 2003/0149809 A1 | 8/2003 | Jensen et al. | 710/22 |
| 2003/0156581 A1 | 8/2003 | Osborne | 370/389 |
| 2003/0163649 A1 | 8/2003 | Kapur et al. | 711/146 |
| 2003/0177320 A1 | 9/2003 | Sah et al. | 711/158 |
| 2003/0193927 A1 | 10/2003 | Hronik | 370/351 |
| 2003/0217223 A1 | 11/2003 | Nino, Jr. et al. | 711/105 |
| 2003/0227798 A1 | 12/2003 | Pax | 365/189.12 |
| 2003/0229762 A1 | 12/2003 | Maiyuran et al. | 711/137 |
| 2003/0229770 A1 | 12/2003 | Jeddeloh | 711/213 |
| 2004/0022094 A1 | 2/2004 | Radhakrishnan et al. | 365/200 |
| 2004/0044833 A1 | 3/2004 | Ryan | 711/5 |
| 2004/0107306 A1 | 6/2004 | Barth et al. | 710/310 |
| 2004/0126115 A1 | 7/2004 | Levy et al. | 398/116 |
| 2004/0128449 A1 | 7/2004 | Osborne et al. | 711/137 |
| 2004/0144994 A1 | 7/2004 | Lee et al. | 257/200 |
| 2004/0160206 A1 * | 8/2004 | Komaki et al. | 318/569 |
| 2004/0193821 A1 * | 9/2004 | Ruhovets et al. | 711/167 |
| 2004/0225847 A1 | 11/2004 | Wastlick et al. | 711/158 |
| 2004/0236885 A1 | 11/2004 | Fredriksson et al. | 710/100 |
| 2004/0251936 A1 | 12/2004 | Gomm | 327/141 |
| 2005/0015426 A1 | 1/2005 | Woodruff et al. | 709/200 |
| 2005/0044327 A1 | 2/2005 | Howard et al. | 711/147 |
| 2005/0071542 A1 | 3/2005 | Weber et al. | 711/105 |
| 2005/0105350 A1 | 5/2005 | Zimmerman | 365/201 |
| 2005/0122153 A1 | 6/2005 | Lin | 327/291 |
| 2005/0149603 A1 | 7/2005 | DeSota et al. | 709/200 |
| 2005/0162882 A1 | 7/2005 | Reeves et al. | 365/63 |
| 2005/0166006 A1 | 7/2005 | Talbot et al. | 711/105 |
| 2006/0022724 A1 | 2/2006 | Zerbe et al. | 327/141 |
| 2006/0218318 A1 * | 9/2006 | James | 710/58 |
| 2006/0271746 A1 | 11/2006 | Meyer et al. | 711/148 |

FOREIGN PATENT DOCUMENTS

| | | |
|---|---|---|
| EP | 0849685 A2 | 6/1998 |
| JP | 2001265539 A | 9/2001 |
| WO | WO 93/19422 | 9/1993 |
| WO | WO 02/27499 A2 | 4/2002 |

OTHER PUBLICATIONS

Micron Technology, Inc., "Synchronous DRAM Module 512MB/1GB (x72, ECC) 168-PIN Registered FBGA SDRAM DIMM", Micron Technology, Inc., 2002, pp. 1-23.

Intel, "Flash Memory PCI Add-In Card for Embedded Systems", Application Note AP-758, Sep. 1997, pp. i-13.

Shanley, T. et al., "PCI System Architecture", Third Edition, Mindshare, Inc., 1995, pp. 24-25.

Rambus, Inc., "Direct Rambus™ Technology Disclosure", Oct. 1997. pp. 1-16.

* cited by examiner

METHOD AND SYSTEM FOR SYNCHRONIZING COMMUNICATIONS LINKS IN A HUB-BASED MEMORY SYSTEM

TECHNICAL FIELD

This invention relates to computer systems, and, more particularly, to a computer system including a system memory having a memory hub architecture.

BACKGROUND OF THE INVENTION

Computer systems use memory devices, such as dynamic random access memory ("DRAM") devices, to store data that are accessed by a processor. These memory devices are normally used as system memory in a computer system. In a typical computer system, the processor communicates with the system memory through a processor bus and a memory controller. The processor issues a memory request, which includes a memory command, such as a read command, and an address designating the location from which data or instructions are to be read. The memory controller uses the command and address to generate appropriate command signals as well as row and column addresses, which are applied to the system memory. In response to the commands and addresses, data are transferred between the system memory and the processor. The memory controller is often part of a system controller, which also includes bus bridge circuitry for coupling the processor bus to an expansion bus, such as a PCI bus.

Although the operating speed of memory devices has continuously increased, this increase in operating speed has not kept pace with increases in the operating speed of processors. Even slower has been the increase in operating speed of memory controllers coupling processors to memory devices. The relatively slow speed of memory controllers and memory devices limits the data bandwidth between the processor and the memory devices.

In addition to the limited bandwidth between processors and memory devices, the performance of computer systems is also limited by latency problems that increase the time required to read data from system memory devices. More specifically, when a memory device read command is coupled to a system memory device, such as a synchronous DRAM ("SDRAM") device, the read data are output from the SDRAM device only after a delay of several clock periods. Therefore, although SDRAM devices can synchronously output burst data at a high data rate, the delay in initially providing the data can significantly slow the operating speed of a computer system using such SDRAM devices.

One approach to alleviating the memory latency problem is to use multiple memory devices coupled to the processor through a memory hub. In a memory hub architecture, a system controller or memory controller is coupled over a high speed link to several memory modules. Typically, the memory modules are coupled in a point-to-point or daisy chain architecture such that the memory modules are connected one to another in series. Thus, the memory controller is coupled to a first memory module over a first high speed link, with the first memory module connected to a second memory module through a second high speed link, and the second memory module coupled to a third memory module through a third high speed link, and so on in a daisy chain fashion.

Each memory module includes a memory hub that is coupled to the corresponding high speed links and a number of memory devices on the module, with the memory hubs efficiently routing memory requests and memory responses between the controller and the memory devices over the high speed links. Computer systems employing this architecture can have a higher bandwidth because a processor can access one memory device while another memory device is responding to a prior memory access. For example, the processor can output write data to one of the memory devices in the system while another memory device in the system is preparing to provide read data to the processor. Moreover, this architecture also provides for easy expansion of the system memory without concern for degradation in signal quality as more memory modules are added, such as occurs in conventional multi drop bus architectures.

Signals are transferred over the high speed links at very high rates, with the links being optical, radio frequency, or other suitable high speed communications media. As the data transfer rate increases, the duration for which each signal being transferred over the high speed link is valid decreases by a corresponding amount, as will be understood by one skilled in the art. More specifically, the data window or "data eye" for each of the signals decreases as the data transfer rate increases. As understood by those skilled in the art, the data eye for each of the signals defines the actual duration for which each signal is valid after timing skew, jitter, duty cycle variation, and other types of unwanted signal distortion are considered. Signal distortion can arise from a variety of sources, such as different loading on the lines of the link and the physical lengths of such lines.

In a conventional system memory, to synchronize memory devices coupled to a memory controller the controller enters an initialization or synchronization mode of operation and applies a test data pattern to the memory devices. Typically, the controller thereafter adjusts the phase of the data strobe signal relative to the signals forming the test data pattern and determines limits for phase shifts of the data strobe signal that allow the memory device to successfully capture the data signals. A phase shift within the determined limits is then selected for use during normal operation of the controller and memory device. In the conventional system memory, each memory device is coupled to the controller over a common memory bus. Conversely, in a memory hub system having a daisy-chain configuration not every memory hub is coupled directly to the controller. The controller does not directly communicate with each memory hub in a memory hub system having more than one memory hub, and therefore the controller cannot synchronize the memory hubs in the same way as in a conventional system memory.

There is a need for a system and method of synchronizing memory hubs in a system memory having a memory hub architecture.

SUMMARY OF THE INVENTION

According to one aspect of the present invention, a method is disclosed for synchronizing communications links in a memory hub system. The memory hub system includes a system controller and a plurality of memory hubs coupled in series, with pairs of downstream and upstream links being coupled between adjacent modules and the controller. The method includes synchronizing each upstream and downstream link. In a clockwise order starting with the downstream link coupled between the controller and the first memory module, the next adjacent clockwise link is signaled that the prior clockwise link has been synchronized. The method then detects through the upstream link coupled between the controller and the first memory module when all links have been synchronized. In a clockwise order starting with the downstream link coupled between the controller and the first memory module, each link is enabled. The method then detects through the upstream link coupled between the controller and the first memory module when all links have been enabled.

DETAILED DESCRIPTION OF THE INVENTION

Figure 1:
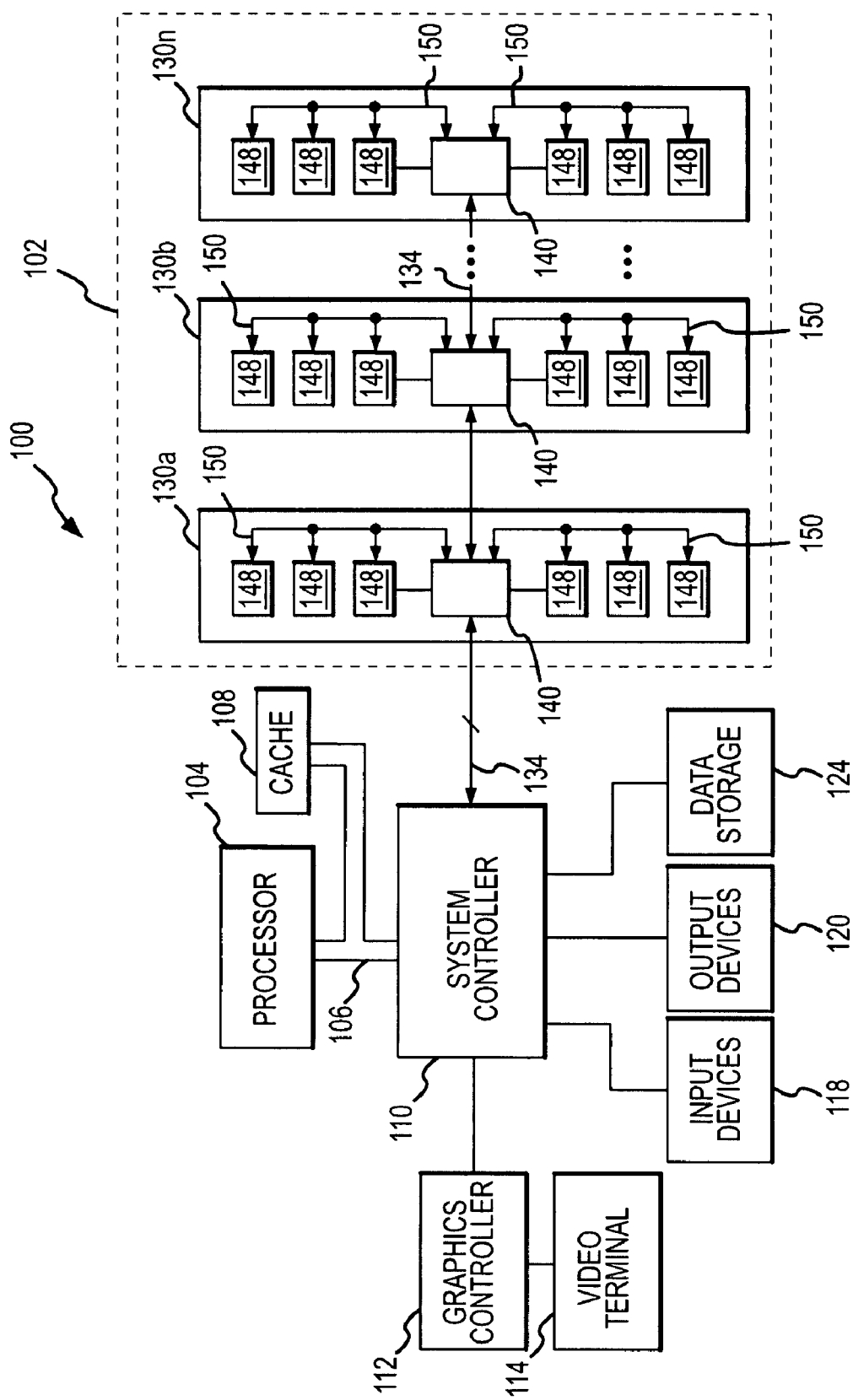
FIG. 1 is a block diagram of a computer system including a system memory having a high-bandwidth memory hub architecture according to one example of the present invention.

A computer system 100 according to one example of the present invention is shown in FIG. 1. The computer system 100 includes a system memory 102 having a memory hub architecture that executes an initialization or synchronization process to synchronize a plurality of memory hubs 140 contained in a plurality of memory modules 130, as will be explained in more detail below. In the following description, certain details are set forth to provide a sufficient understanding of the present invention. One skilled in the art will understand, however, that the invention may be practiced without these particular details. In other instances, well-known circuits, control signals, timing protocols, and/or software operations have not been shown in detail or omitted entirely in order to avoid unnecessarily obscuring the present invention.

The computer system 100 includes a processor 104 for performing various computing functions, such as executing specific software to perform specific calculations or tasks. The processor 104 is typically a central processing unit ("CPU") having a processor bus 106 that normally includes an address bus, a control bus, and a data bus. The processor bus 106 is typically coupled to a cache memory 108, which is usually static random access memory ("SRAM"). Finally, the processor bus 106 is coupled to a system controller 110, which is also sometimes referred to as a "North Bridge" or "memory controller."

The system controller 110 serves as a communications path to the processor 104 for the memory modules 130 and for a variety of other components. More specifically, the system controller 110 includes a graphics port that is typically coupled to a graphics controller 112, which is, in turn, coupled to a video terminal 114. The system controller 110 is also coupled to one or more input devices 118, such as a keyboard or a mouse, to allow an operator to interface with the computer system 100. Typically, the computer system 100 also includes one or more output devices 120, such as a printer, coupled to the processor 104 through the system controller 110. One or more data storage devices 124 are also typically coupled to the processor 104 through the system controller 110 to allow the processor 104 to store data or retrieve data from internal or external storage media (not shown). Examples of typical storage devices 124 include hard and floppy disks, tape cassettes, and compact disk read-only memories (CD-ROMs).

The system controller 110 is coupled to the system memory 102 including the memory modules 130a,b...n, and operates to apply commands to control and access data in the memory modules. The system controller 110 also initiates a synchronization mode of operation of the controller and memory modules 130, as will be explained in more detail below. The memory modules 130 are coupled in a point-to-point or daisy chain architecture through respective high speed links 134 coupled between the modules and the system controller 110. The high-speed links 134 may be optical, RF, or electrical communications paths, or may be some other suitable type of communications paths, as will be appreciated by those skilled in the art. In the event the high-speed links 134 are implemented as optical communications paths, each optical communication path may be in the form of one or more optical fibers, for example. In such a system, the system controller 110 and the memory modules 130 will each include an optical input/output port or separate input and output ports coupled to the corresponding optical communications paths. Although the memory modules 130 are shown coupled to the system controller 110 in a daisy architecture, other topologies that may be used, such as a ring topology, will be apparent to those skilled in the art.

Each of the memory modules 130 includes the memory hub 140 for communicating over the corresponding high-speed links 134 and for controlling access to six memory devices 148, which are synchronous dynamic random access memory ("SDRAM") devices in the example of FIG. 1. The memory hubs 140 each include input and output interfaces or ports that are coupled to the corresponding high-speed links 134, with the nature and number of ports depending on the characteristics of the high-speed links. A fewer or greater number of memory devices 148 may be used, and memory devices other than SDRAM devices may also be used. The memory hub 140 is coupled to each of the system memory devices 148 through a bus system 150, which normally includes a control bus, an address bus, and a data bus.

Figure 2:
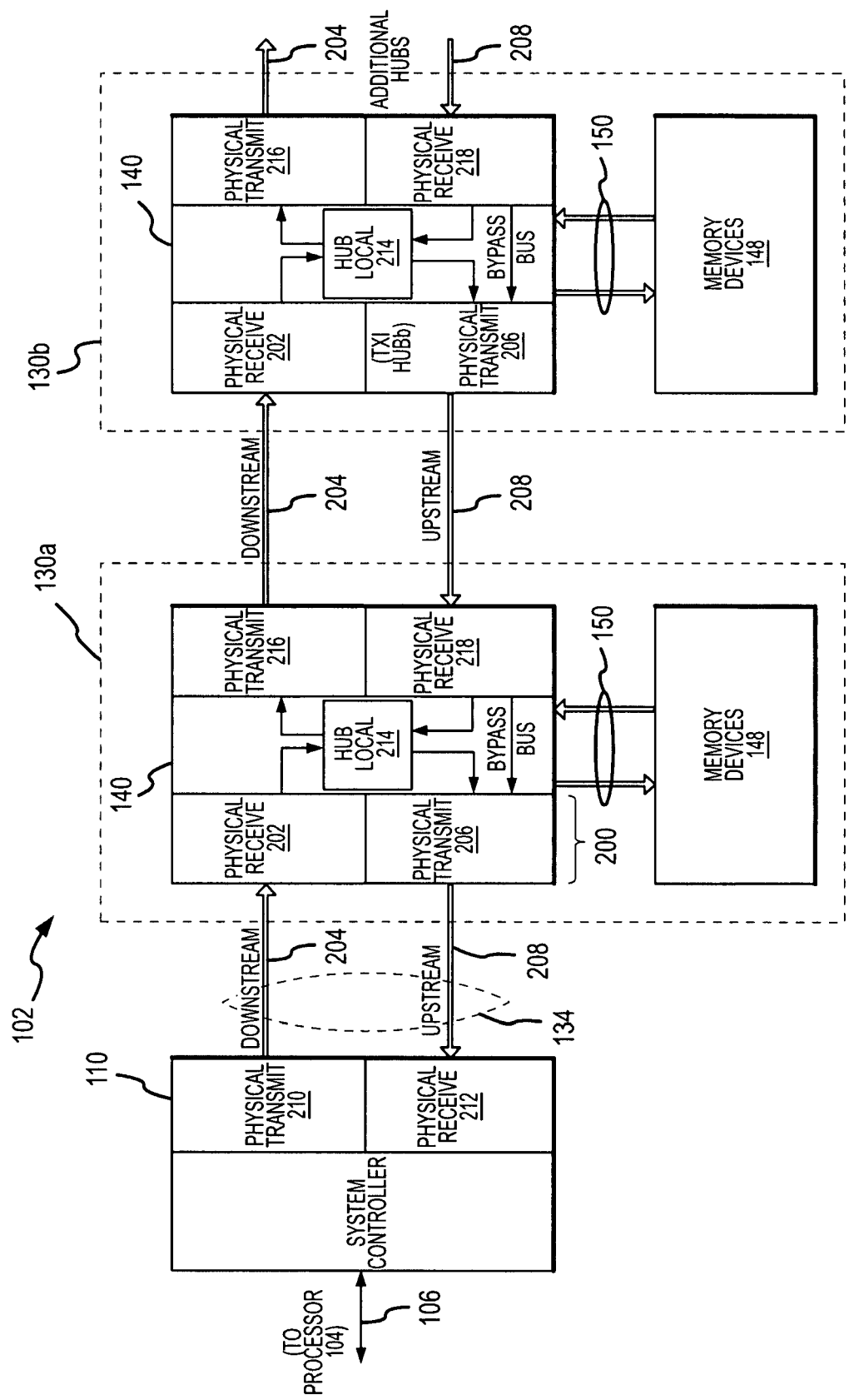
FIG. 2 is a block diagram illustrating in more detail the memory hubs contained in the memory modules in the system memory of FIG. 1 according to one example of the present invention.

FIG. 2 is a block diagram illustrating in more detail the memory hubs in the memory modules 130a and 130b and link interface components in the system controller 110. In the memory module 130a, the memory hub 140 includes a link interface 200 that is connected to the high-speed link 134 coupled to the system controller 110. The link interface 200 includes a downstream physical reception port 202 that receives downstream memory requests from the system controller 110 over a downstream high-speed link 204, and includes an upstream physical transmission port 206 that provides upstream memory responses to the system controller over an upstream high-speed link 208. The downstream and upstream high-speed links 204, 208 collectively form the corresponding high-speed link 134.

The system controller 110 includes a downstream physical transmission port 210 coupled to the downstream high-speed link 204 to provide memory requests to the memory module 130a, and also includes an upstream physical reception port 212 coupled to the upstream high-speed link 208 to receive memory responses from the memory module 130a. The ports 202, 206, 210, 212 and other ports to be discussed below are designated "physical" interfaces or ports since these ports are in what is commonly termed the "physical layer" of a communications system. In this case, the physical layer corresponds to components providing the actual physical connection and communications between the system controller 110 and system memory 102 (FIG. 1), as will be understood by those skilled in the art.

The nature of the physical reception ports 202, 212 and physical transmission ports 206, 210 will depend upon the characteristics of the high-speed links 204, 208. For example, in the event the high-speed links 204, 208 are implemented using optical communications paths, the reception ports 202, 212 will convert optical signals received through the optical communications path into electrical signals and the transmission ports will convert electrical signals into optical signals that are then transmitted over the corresponding optical communications path.

In operation, the physical reception port 202 captures the downstream memory requests and provides the captured memory request to local hub circuitry 214, which includes control logic for processing the request and accessing the memory devices 148 over the bus system 150 to provide the corresponding data when the request packet is directed to the memory module 130a. The local hub circuitry 214 also provides the captured downstream memory request to a downstream physical transmission port 216. The downstream physical transmission port 216, in turn, provides the memory request over the corresponding downstream high-speed link 204 to a downstream physical reception port 202 in the adjacent downstream memory module 130b. The port 202 in module 130b operates in the same way as the corresponding port in the module 130a, namely to capture the memory request and provide the request to local hub circuitry 214, which processes the request and provides the request to a downstream physical transmission port 216. The port 216 in the module 130b then operates in the same way as the corresponding port in module 130a to provide the memory request over the corresponding downstream high-speed link 204 to the next downstream memory module 130c (not shown in FIG. 2).

The memory hub 140 in the module 130a further includes an upstream physical reception port 218 that receives memory responses over the corresponding upstream high-speed link 208 from an upstream physical transmission port 206 in the module 130b. The reception port 218 captures the received memory responses and provides them to the local hub circuitry 214, which stores the responses and provides the responses to the upstream physical transmission port 206, or the responses may be directed to the upstream physical transmission on the bypass bus, if the transmission port is not processing hub local responses. The upstream physical transmission port 206, in turn, provides the response over the upstream high-speed link 208 to the upstream physical reception port 212 in the system controller 212. Each of the memory modules 130 includes a corresponding downstream physical reception port 202, upstream physical transmission port 206, downstream physical transmission port 216, and upstream physical reception port 218. Moreover, these ports 202, 206, 216, 218 in each module 130 operate in the same way as just described for the corresponding ports in the module 130a.

During a synchronization mode of operation, the system controller 110 and the ports 202, 206, 216, and 218 operate to synchronize each of the downstream high-speed links 204 and upstream high-speed links 208, as will now be described in more detail with reference to FIGS. 3 and 4. Briefly, the synchronization process includes two stages, an initialization stage and an enablement stage. In the initialization stage, the transmission-reception port pairs associated with each high-speed link 204, 208 are synchronized, and the system controller 110 is notified when all such pairs have been synchronized. When the system controller 110 is notified the initialization stage has been completed, the enablement stage commences and the reception and transmission ports in the controller 110 and modules 130 are sequentially enabled to start receiving and transmitting functional operations. A transmission-reception port pair is the pair of ports associated with a particular high-speed link 204, 208, and thus, for example, the ports 210 and port 202 in module 130a are a transmission-reception port pair, as are the port 216 in module 130a and the port 202 in module 130b, and so on. The link 204 or 208 and the corresponding transmission-reception port pair may be collectively referred to simply as a "link" in the following description.

Figure 3:
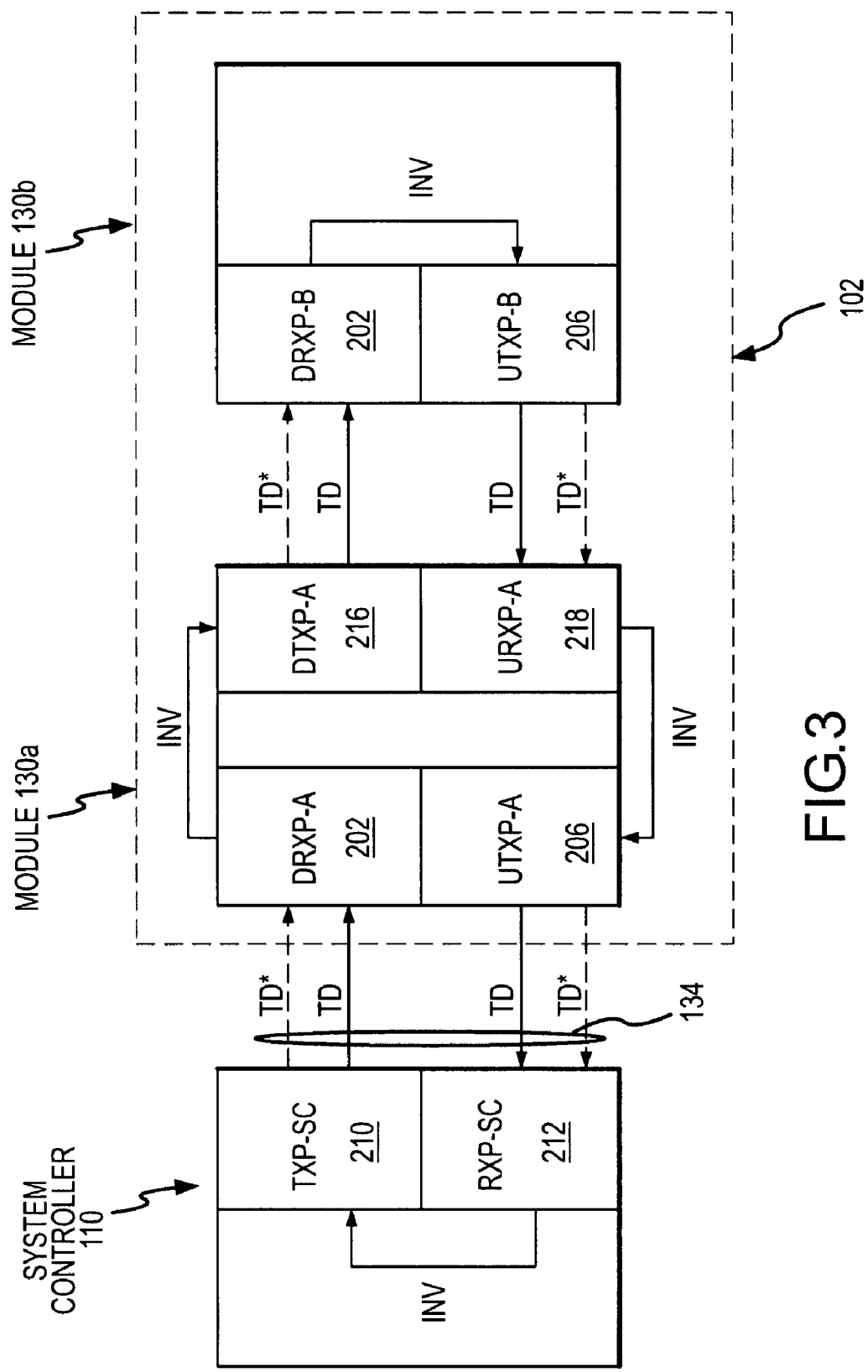
FIG. 3 is a functional diagram illustrating the operation of the system controller and the memory modules of FIG. 2 during an initialization stage of a synchronization process according to one embodiment of the present invention.

FIG. 3 is a functional diagram illustrating the operation of the system controller 110 and the memory modules 130a and 130b during the initialization stage of operation. In the example of FIG. 3, the system memory 102 is assumed to include only the two memory modules 130a and 130b for ease of explanation, and from this example description one skilled in the art will readily understand the operation in the initialization stage when the system memory 102 includes additional memory modules. In FIG. 3, the ports 210 and 212 in the system controller 110 and ports 202, 206, 216, 218 in the modules 130a, 130b have been designated using new identifiers to simplify the description of the initialization stage of operation. More specifically, the transmission port 210 and reception port 212 in the system controller 110 have been designated TXP-SC and RXP-SC, respectively, where the "SC" indicates the ports are contained in the controller and "TX" indicates a transmission port and "RX" a reception port. The downstream physical reception port 202 in modules 130a and 130b have been designated DRXP-A and DRXP-B, respectively, where the "A" and "B" indicate the ports are contained in the modules 130a and 130b, respectively, and the "U" indicates an upstream port. Similarly, the upstream physical transmission ports 206 in the modules 130a and 130b are designated UTXP-A and UTXP-B, respectively. The downstream physical transmission port 216 in module 130a is designated DTXP-A where the "D" indicates a downstream port. The upstream physical reception port 218 in module 130a is designated URXP-A. Note that since the module 130b is the last module in the example of FIG. 3, the ports 216, 218 in this module are not utilized and are thus not shown in FIG. 3.

To start the synchronization process, the system controller 110 and memory modules 130a, 130b are placed in an initialization mode of operation. This may occur, for example, upon power up of the computer system 100 (FIG. 1). In the initialization mode, each transmission port TXP-SC, DTXP-A, UTXP-B, UTXP-A and reception port DRXP-A, DRXP-B, URXP-A, RXP-SC pair execute an initialization routine to determine a desired phase shift of a generated receive clock signal relative to test data being sent to the reception port. Thus, the TXP-SC-DRXP-A ports execute an initialization routine, as do the DTXP-A-DRXP-B 202 ports, the UTXP-B-URXP-A ports, and the UTXP-A-RXP-SC ports.

The specific initialization routine executed by each pair may vary. In one embodiment, each transmission port TXP-SC, DTXP-A, UTXP-B, UTXP-A applies test data TD to the corresponding reception port DRXP-A, DRXP-B, URXP-A, RXP-SC. The test data may have a variety of different values, and could, for example, be a pseudo random bit pattern. The reception port DRXP-A, DRXP-B, URXP-A, RXP-SC captures the test data responsive to a generated receive clock, and then determines whether the test data was successfully captured. The reception port DRXP-A, DRXP-B, URXP-A, RXP-SC adjusts the phase of the generated receive clock signal relative to the test data and once again determines whether the test data was successfully captured. In this way, the reception port DRXP-A, DRXP-B, URXP-A, RXP-SC "paints" a data eye for the test data by determining limits for the phase shift of the generated receive clock signal that allow the test data to be successfully captured. Once all phase shifts for the generated receive clock signal have been used, the reception port DRXP-A, DRXP-B, URXP-A, RXP-SC selects one of the phase shifts for use during normal operation of the system memory 102.

Because multiple high-speed links 134 must be synchronized, the controller 110 must be able to determine when all links have been successfully synchronized. Accordingly, during the initialization stage of operation, once the RXP-SC port has painted the corresponding data eye and selected the phase of the generated receive clock signal to be used during normal operation, the RXP-SC port applies an invert signal INV to the TXP-SC port. In response to the INV signal, the TXP-SC port inverts the test data being sent to the DRXP-A port, meaning that the bit-wise complement of each test data word being transmitted is now provided by the TXP-SC port. For example, if a 15-bit pseudo random sequence "11101011001000" is applied for each bit of a test data word, the TXP-SC port would provide the complement of this sequence, namely "00010100110111." This inverted test data is indicated as TD* in FIG. 3.

When the DRXP-A port receives inverted test data TD*, this indicates that the RXP-SC port has been synchronized. Once the DRXP-A port has painted the corresponding data eye and selected the phase of the generated receive clock signal to be used during normal operation (i.e., has been synchronized), the DRXP-A port applies an invert signal INV to the DTXP-A port. In response to the INV signal, the DTXP-A port provides inverted test data TD* to the DRXP-B port, indicating the DRXP-A port has been synchronized. Once the DRXP-B port has been synchronized, the port applies an invert signal INV to the UTXP-B port which, in turn, applies inverted test data TD* to the URXP-A port. The URXP-A port the operates in the same way, and once synchronized applies an invert signal INV to the UTXP-A port, which then applies inverted test data TD* to the RXP-SC port.

When the RXP-SC port receives the inverted test data TD*, the system controller 110 determines that all the transmission-reception port pairs have been synchronized, and the thus all the ports are ready to be placed into a normal mode of operation to allow normal operation of the computer system 100. Accordingly, at this point the controller 110 and system memory 102 enter the enablement stage of the synchronization process, as will now be described in more detail. The term "enablement" is used to indicate that the ports are placed in a normal mode of operation to transfer or receive functional commands in the system memory 102, such as read or write commands from the system controller 110.

Figure 4:
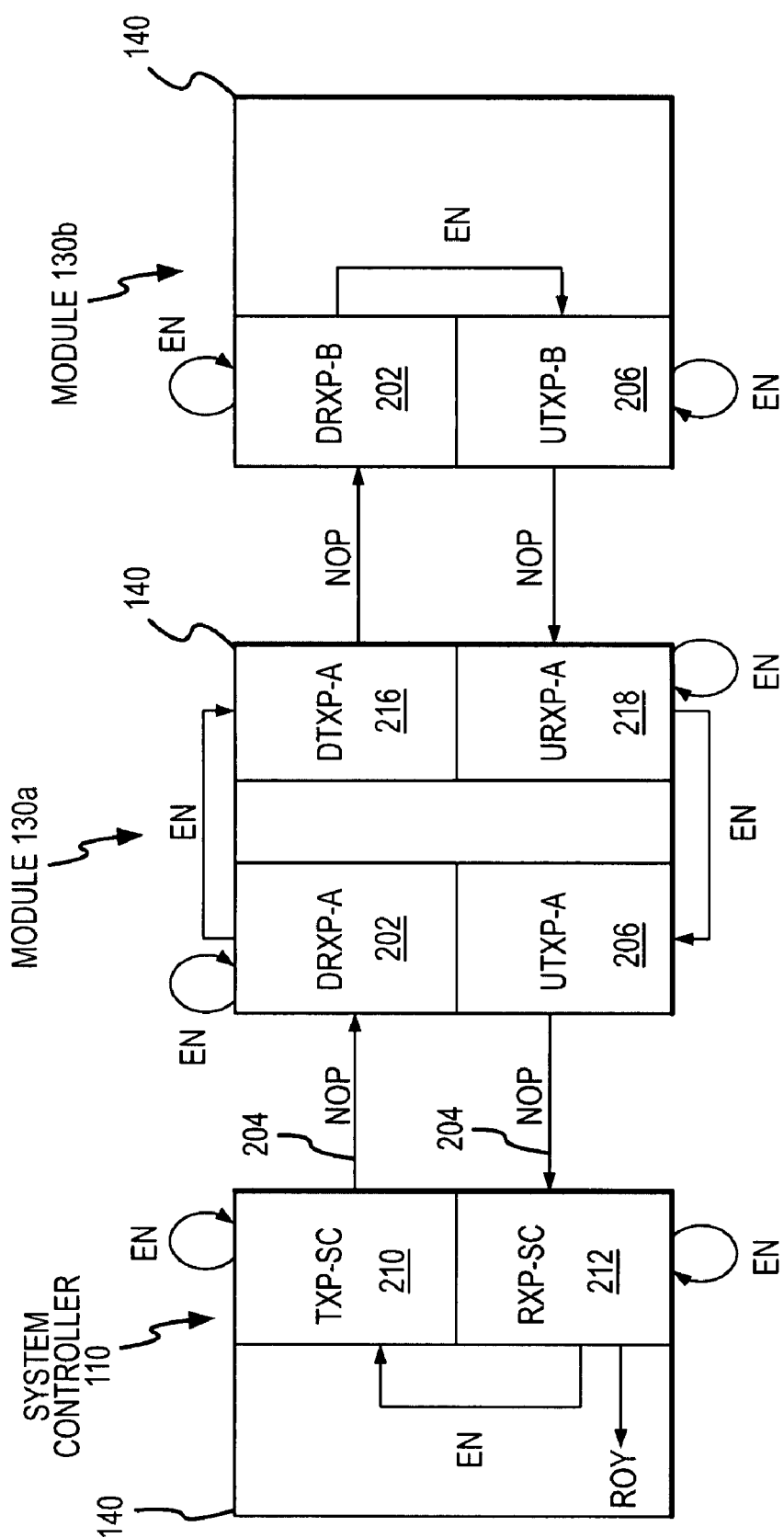
FIG. 4 is a functional diagram illustrating the operation of the system controller and memory modules of FIG. 2 during an enablement stage of a synchronization process according to one embodiment of the present invention.

FIG. 4 is a functional diagram illustrating the operation of the system controller 110 and memory modules 130 of FIG. 2 during the enablement stage of the synchronization process according to one embodiment of the present invention. As previously mentioned, once the RXP-SC port receives the inverted test data TD* the system controller 110 determines that all the transmission-reception port pairs have been synchronized. More specifically, when the RXP-SC port receives the TD* data, the port applies an active enable signal EN to the TXP-SC port. In response to the enable signal, the TXP-SC port is enabled as indicated by the looped arrow with the EN designation in FIG. 4. Once enabled, the TXP-SC port starts sending no operation or "NOP" commands to the DRXP-A port. A NOP command is a valid command used during normal operation of a memory system but which causes a receiving module to perform no action, as will be understood by those skilled in the art.

Upon receiving the NOP commands from the TXP-SC port, the DRXP-A is enabled and also applies an active enable signal EN to the DTXP-A port. In response to the enable signal, the DTXP-A port is enabled and, in turn, starts sending NOP commands to the DRXP-B port. The DRXP-B port is enabled responsive to the NOP commands, and also provides an active enable signal EN to active the UTXP-B port. Once activated, the UTXP-B port starts sending NOP commands to the URXP-A port, and this port is enabled responsive to the NOP commands. The URXP-A port thereafter applies an active enable signal EN to the UTXP-A port to active this port, which, in turn, starts sending NOP commands to the RXP-SC port in the system controller 110. Upon receiving the NOP commands, the RXP-SC port generates a ready signal RDY, indicating that the synchronization process is now complete and signaling to the controller 110 that normal functional commands such as read and write commands may now be applied to the memory modules 130.

The initialization stage of the synchronization process synchronizes each of the links 204, 208 and the associated transmission-reception port pair. The system controller 110 is notified when all the transmission-reception port pairs have been synchronized. At this point in time, all the ports in the controller 110 and modules 130 may be enabled to allow functional commands to be processed by the system memory 102. The ports may not simply be randomly enabled, however, or erroneous operation of the system memory could result. For example, if the TXP-SC port were simply enabled once the DRXP-A port was synchronized, the controller 110 could then output a functional command through the TXP-SC port. If one of the downstream ports were not enabled, however, then this functional command may not be applied to all memory hubs 140 as desired. For example, if the DTXP-A port was not yet enabled to transmit functional commands (i.e., was still synchronizing the DRXP-B port), then the functional command would not be applied to module 130b as desired. The present synchronization process eliminates this possibility by sequentially enabling the ports in a clockwise manner starting with the TXP-SC port and ending with the RXP-SC port in the controller 110. In this way, downstream links are sequentially enabled starting from the controller 110 and progressing downstream, and upstream links are sequentially enabled starting with the module 130 furthest downstream and ending with the controller.

One skilled in the art will understand suitable circuitry for forming the components of the memory hubs 140, and will understand that the components may be implemented using either digital or analog circuitry, or a combination of both, and also, where appropriate, may be realized through software executing on suitable processing circuitry. Moreover, in the above description the ports are discussed as applying the INV and EN signals to adjacent ports during the synchronization process. These signals may be applied to the adjacent ports through the local hub circuitry 214 or directly as described, as will be appreciate by those skilled in the art. Similarly, some of functionality of the ports may be performed by the local hub circuitry 214. The division of the functionality among one or more components in the hubs 140 is not important so long as the components operate in combination to perform the described functions, as will also be appreciated by those skilled in the art.

In the preceding description, certain details were set forth to provide a sufficient understanding of the present invention. One skilled in the art will appreciate, however, that the invention may be practiced without these particular details. Furthermore, one skilled in the art will appreciate that the example embodiments described above do not limit the scope of the present invention, and will also understand that various equivalent embodiments or combinations of the disclosed example embodiments are within the scope of the present invention illustrative examples set forth above are intended only to further illustrate certain details of the various embodiments, and should not be interpreted as limiting the scope of the present invention. Also, in the description above the operation of well known components has not been shown or described in detail to avoid unnecessarily obscuring the present invention. Finally, the invention is to be limited only by the appended claims, and is not limited to the described examples or embodiments of the invention.

The invention claimed is:

1. A memory hub, comprising:
a downstream reception interface operable in an initialization mode to adjust a phase of a generated receive clock signal relative to applied test data signals and to generate an inversion signal once a final phase of the generated receive clock is determined, and operable in an enablement mode responsive to receiving an enablement command to generate an enablement signal and to place the downstream reception interface in the normal mode of operation;
a downstream transmission interface operable in the initialization mode to apply test data signals on an output and operable to adjust the value of the test data signals responsive to the inversion signal from the downstream reception interface, and operable in the enablement mode responsive to the enablement signal from the downstream reception interface to provide the enablement command on the output and to place the downstream transmission interface into the normal mode of operation;
an upstream reception interface operable in the initialization mode to adjust a phase of the generated receive clock signal relative to applied test data signals and to generate an inversion signal once a final phase of the generated receive clock is determined, and operable in an enablement mode responsive to receiving an enablement command to generate an enablement signal and to place the upstream reception interface into the normal mode of operation; and
an upstream transmission interface operable in the initialization mode to apply test data signals on an output and operable to adjust the value of the test data signals responsive to the inversion signal from the upstream reception interface, and operable in the enablement mode responsive to the enablement signal from the upstream reception interface to provide the enablement command on the output and to place the upstream transmission interface into the normal mode of operation.

2. The memory hub of claim 1 wherein the enablement command comprises a No Operation command.

3. The memory hub of claim 1 wherein the downstream and upstream transmission interfaces adjust the value of the corresponding test data signals responsive to the inversion signal by inverting the test data signals.

4. The memory hub of claim 1 further comprising local hub circuitry coupled to the interfaces, the local control circuitry operable process memory requests during the normal mode of operation and to develop corresponding memory signals on a memory bus output.

5. The memory hub of claim 4, wherein the memory signals comprise address, data, and control signals.

6. The memory hub of claim 1 wherein the reception interfaces include optical interfaces to receive data words from an optical communications link.

7. The memory hub of claim 6 wherein the downstream reception interface and the upstream transmission interface are configured to be coupled to the same optical communications link, and wherein the downstream transmission interface and the upstream reception interface are configured to be coupled to the same optical communications link.

8. The memory hub of claim 7 wherein the optical communications link comprises an optical fiber.

9. A memory module, comprising:
a plurality of memory devices; and
a memory hub, comprising:
a downstream reception interface operable in an initialization mode to adjust a phase of a generated receive clock signal relative to applied test data signals and to generate an inversion signal once a final phase of the generated receive clock signal is determined, and operable in an enablement mode responsive to receiving an enablement command to generate an enablement signal and to place the downstream reception interface in the normal mode of operation;
a downstream transmission interface operable in the initialization mode to apply test data signals on an output and operable to adjust the value of the test data signals responsive to the inversion signal from the downstream reception interface, and operable in the enablement mode responsive to the enablement signal from the downstream reception interface to provide the enablement command on the output and to place the downstream transmission interface into the normal mode of operation;
an upstream reception interface operable in the initialization mode to adjust a phase of the generated receive clock signal relative to applied test data signals and to generate an inversion signal once a final phase of the generated receive clock is determined, and operable in an enablement mode responsive to receiving an enablement command to generate an enablement signal and to place the upstream reception interface into the normal mode of operation;
an upstream transmission interface operable in the initialization mode to apply test data signals on an output and operable to adjust the value of the test data signals responsive to the inversion signal from the upstream reception interface, and operable in the enablement mode responsive to the enablement signal from the upstream reception interface to provide the enablement command on the output and to place the upstream transmission interface into the normal mode of operation; and
local hub circuitry coupled to the interfaces and to the memory devices.

10. The memory module of claim 9 wherein the enablement command comprises a No Operation command.

11. The memory module of claim 9 wherein the downstream and upstream transmission interfaces adjust the value of the corresponding test data signals responsive to the inversion signal by inverting the test data signals.

12. The memory module of claim 9 wherein the memory signals comprise address, data, and control signals.

13. The memory module of claim 9 wherein the memory devices comprise SDRAMs.

14. The memory module of claim 9 wherein the reception interfaces include optical interfaces to receive data words from an optical communications link.

15. The memory module of claim 14 wherein the downstream reception interface and the upstream transmission interface are configured to be coupled to the same optical communications link, and wherein the downstream transmission interface and the upstream reception interface are configured to be coupled to the same optical communications link.

16. The memory module of claim 15 wherein the optical communications link comprises an optical fiber.

17. A memory system, comprising:
a plurality of memory modules coupled in series, each module being coupled to adjacent modules through respective downstream and upstream high-speed communications links, each memory module comprising:
a plurality of memory devices; and
a memory hub, comprising:
a downstream reception interface operable in an initialization mode to adjust a phase of a generated receive clock signal relative to applied test data signals and to generate an inversion signal once a final phase of the generated receive clock signal is determined, and operable in an enablement mode responsive to receiving an enablement command to generate an enablement signal and to place the downstream reception interface in the normal mode of operation;
a downstream transmission interface operable in the initialization mode to apply test data signals on an output and operable to adjust the value of the test data signals responsive to the inversion signal from the downstream reception interface, and operable in the enablement mode responsive to the enablement signal from the downstream reception interface to provide the enablement command on the output and to place the downstream transmission interface into the normal mode of operation;
an upstream reception interface operable in the initialization mode to adjust a phase of the generated receive clock signal relative to applied test data signals and to generate an inversion signal once a final phase of the generated receive clock signal is determined, and operable in an enablement mode responsive to receiving an enablement command to generate an enablement signal and to place the upstream reception interface into the normal mode of operation;
an upstream transmission interface operable in the initialization mode to apply test data signals on an output and operable to adjust the value of the test data signals responsive to the inversion signal from the upstream reception interface, and operable in the enablement mode responsive to the enablement signal from the upstream reception interface to provide the enablement command on the output and to place the upstream transmission interface into the normal mode of operation; and
local hub circuitry coupled to the interfaces and to the memory devices; and
a system controller coupled to a first one of the memory modules through respective downstream and upstream high-speed communications links.

18. The memory system of claim 17 wherein the system controller further comprises:
a downstream transmission interface coupled to the downstream high-speed communications link, the interface operable in the initialization mode to apply test data signals on an output and operable to adjust the value of the test data signals responsive to an inversion signal, and operable in the enablement mode responsive to an enablement signal to provide an enablement command on the output and to place the downstream transmission interface into the normal mode of operation; and
an upstream reception interface coupled to the upstream high-speed communications link, the interface operable in the initialization mode to adjust a phase of a generated receive clock signal relative to applied test data signals and to generate the inversion signal once a final phase of the generated receive clock signal is determined, and operable in an enablement mode responsive to receiving an enablement command to generate an enablement signal and to place the upstream reception interface into the normal mode of operation, and further operable responsive to receiving the enablement command to generate a ready signal indicating all the memory modules have been synchronized.

19. The memory system of claim 17 wherein the enablement command comprises a No Operation command.

20. The memory system of claim 17 wherein the downstream and upstream transmission interfaces adjust the value of the corresponding test data signals responsive to the inversion signal by inverting the test data signals.

21. The memory system of claim 17 wherein the memory signals comprise address, data, and control signals.

22. The memory system of claim 17 wherein the memory devices comprise SDRAMs.

23. The memory system of claim 17 wherein the reception interfaces include optical interfaces to receive data words from an optical communications link.

24. The memory system of claim 23 wherein in each memory module the downstream reception interface and the upstream transmission interface are coupled to the same optical communications link, and wherein the downstream transmission interface and the upstream reception interface are coupled to the same optical communications link.

25. The memory system of claim 24 wherein the optical communications link comprises an optical fiber.

26. A computer system, comprising:
a processor;
a system controller coupled to the processor through respective downstream and upstream high-speed communications links;
a memory system, comprising:
a plurality of memory modules coupled in series, each module being coupled to adjacent modules through respective downstream and upstream high-speed communications links, and a first one of the modules being coupled to the processor through respective downstream and upstream high-speed communications links, each memory module comprising:
a plurality of memory devices; and
a memory hub, comprising:
a downstream reception interface operable in an initialization mode to adjust a phase of a generated receive clock signal relative to applied test data signals and to generate an inversion signal once a final phase of the generated receive clock signal is determined, and operable in an enablement mode responsive to receiving an enablement command to generate an enablement signal and to place the downstream reception interface in the normal mode of operation;
a downstream transmission interface operable in the initialization mode to apply test data signals on an output and operable to adjust the value of the test data signals responsive to the inversion signal from the downstream reception interface, and operable in the enablement mode responsive to the enablement signal from the downstream reception interface to provide the enablement command on the output and to place the downstream transmission interface into the normal mode of operation;

an upstream reception interface operable in the initialization mode to adjust a phase of the generated receive clock signal relative to applied test data signals and to generate an inversion signal once a final phase of the generated receive clock signal is determined, and operable in an enablement mode responsive to receiving an enablement command to generate an enablement signal and to place the upstream reception interface into the normal mode of operation;

an upstream transmission interface operable in the initialization mode to apply test data signals on an output and operable to adjust the value of the test data signals responsive to the inversion signal from the upstream reception interface, and operable in the enablement mode responsive to the enablement signal from the upstream reception interface to provide the enablement command on the output and to place the upstream transmission interface into the normal mode of operation; and local hub circuitry coupled to the interfaces and to the memory devices.

27. The computer system of claim 26 wherein the system controller further comprises:

a downstream transmission interface coupled to the downstream high-speed communications link, the downstream transmission interface operable in the initialization mode to apply test data signals on an output and operable to adjust the value of the test data signals responsive to an inversion signal, and operable in the enablement mode responsive to an enablement signal to provide an enablement command on the output and to place the downstream transmission interface into the normal mode of operation; and an upstream reception interface coupled to the upstream high-speed communications link, the upstream reception interface operable in the initialization mode to adjust a phase of a generated receive clock signal relative to applied test data signals and to generate the inversion signal once a final phase of the generated receive clock signal is determined, and operable in an enablement mode responsive to receiving an enablement command to generate an enablement signal and to place the upstream reception interface into the normal mode of operation, and further operable responsive to receiving the enablement command to generate a ready signal indicating all the memory modules have been synchronized.

28. The memory system of claim 26 wherein the enablement command comprises a No Operation command.

29. The computer system of claim 26 wherein the memory devices comprise SDRAMs.

30. The computer system of claim 26 wherein each of the high-speed links comprises an optical communications link.

31. The computer system of claim 26 wherein the processor comprises a central processing unit (CPU).

* * * * *